US005580586A

United States Patent [19]

Yokoyama

[11] Patent Number: 5,580,586

[45] Date of Patent: Dec. 3, 1996

[54] DIE CONTROL SPEED RATE CONVERSION DEVICE FOR POWDER MOLD PRESS

[75] Inventor: Tatsuichi Yokoyama, Nagaoka, Japan

[73] Assignee: Tamagawa Machinery Co., Ltd., Tokyo, Japan

[21] Appl. No.: 214,978

[22] Filed: Mar. 17, 1994

[51] Int. Cl.[6] .................. B29C 43/58; B30B 11/02

[52] U.S. Cl. .................. 425/150; 425/78; 425/352; 425/355; 425/415

[58] Field of Search .................. 425/78, 149, 150, 425/352, 355, 415, 419

[56] References Cited

U.S. PATENT DOCUMENTS

| | | | |
|---|---|---|---|
| 3,758,245 | 9/1973 | Hermes | 425/78 |
| 3,868,201 | 2/1975 | Jacobson et al. | 425/78 |
| 4,260,346 | 4/1981 | Anderson, Jr. et al. | 425/78 |
| 4,370,119 | 1/1983 | Watanabe | 425/78 |
| 4,379,684 | 4/1983 | Katagiri et al. | 425/78 |
| 4,392,800 | 7/1983 | Apuzzo | 425/78 |
| 4,460,326 | 7/1984 | Croseck et al. | 425/78 |
| 4,923,382 | 5/1990 | Klein | 425/78 |
| 5,043,111 | 8/1991 | Hinzmann et al. | 425/78 |

*Primary Examiner*—James P. Mackey
*Attorney, Agent, or Firm*—Lackenbach, Siegel Marzlllo, Aronson & Greenspan

[57] ABSTRACT

A die control speed rate conversion device for a powder mold press wherein the timing for oil release from a hydraulic circuit can be obtained by the angle signal (position signal) from a rotary encoder on the main axis of the press actuating synchronously with an upper punch, and the speed of descent of a die relative to an upper ram can be controlled at any rate ranging from 1:1 to 1:¼ by a sevomotor controlled by the signal from a linear sensor detecting the movement of the upper ram.

2 Claims, 2 Drawing Sheets

DIE CONTROL SPEED RATE CONVERSION DEVICE FOR POWDER MOLD PRESS

BACKGROUND OF THE INVENTION

The present invention relates to a device capable of freely converting the rate of die-working speed relative to upper punch speed during powder mold pressing.

Generally, when pressing powder through a withdrawal-type press, the timing and speed of descent of a die relative to an upper punch is controlled as in, for example, Japanese Patent Publication No. S62(1987)-29160.

Said example is, as depicted in FIG. 2, a floating die press comprising an upper ram 101, lower press plate 116, a hydraulic cylinder 118 mounted on said ram 101, the lower end of a piston thereof being abuttable to a rack 122, as well as an oscillating lever 123 with a sector gear 123*a*, and a cam 127 installed on the press frame side contacting with the top roller 126 of the oscillating lever 123, said floating die press being a die control device for a powder mold press wherein the ram 101 can descend, corresponding to the variation of predetermined angle on the cam 127. Further, a lower press plate 102 is attached integrally to the lower portion of the upper ram 101, the lower press plate 102 being connected with an upper punch plate 103 of the die set through a joint 104. Moreover, a lower descending press plate 116 is attached integrally to the lower ram 117 thereon, the plate 116 being connected with an injection plate 114 by means of a joint 115.

A plurality of guide rods 106 are vertically embedded in a die plate 107, said rods 106 slidably engaged with the upper punch plate 103 so that an upper punch 105 can enter and leave a die 109.

A die fixing plate 111, secured to a press bolster 112, has a lower punch 110 attached thereto, with the upper portion thereof filled to the die 109 so as to be movable up and down.

Thus, when the upper ram 101 finishes compacting, the lower ram 117 is pulled down by an injection cam (not illustrated) so as to complete injection of a product through descending the die plate 107 to the upper face of the lower punch 110.

The hydraulic cylinder 118 is provided on said lower press plate 102 of the upper ram 101 with a piston 119 having a rod 120 extending downward to the end thereof at which a nut 121 is engaged so as to adjust the length thereof. Corresponding to the descent of the nut 121 by means of said upper punch 105, the clearance between the nut 121 and the rack 122 is lessened, resulting in abutting thereof.

The oscillating lever 123 is pivotally supported by a pin 124 of a bracket 116*a* disposed on both sides of the lower press plate 116 (the one side not illustrated), on the one side of the oscillating lever 123 being formed a sector gear 123*a* to engage with the rack 122, whereas at the other end thereof the roller 126 is pivotally supported by a pin 125. A cam 127 is pivotally supported by a pin 128 on the bracket of said press frame wherein the rotation of the cam 127 is restricted by a positioning bolt 129. Returning springs 130*a*, 130*b* are attached to the cam 127 and rack 122, respectively.

Further, a support cylinder 133 is connected with the lower press plate 116 so as to keep the lower ram 117 at the predetermined position through a rod 142.

FIG. 2 depicts the commencement of pressing, wherein when 0=o, i.e., the cam 127 is vertical, even though the descending stroke of the upper ram 101 will rotate the sector gear 123*a* of the oscillating lever 123 by pushing the rack 122 down, the powder 108 is compressed upwards only because the lower press plate 116 of the lower ram 117 is descended only corresponding to the stroke of the upper ram 101, due to the rotation of the cam 127 of the roller 126 of the oscillating lever 123 being restricted by the bolt 129 attached to the press frame. In such a compressing stroke of the lower punch 110, hydraulic oil is poured into the die interior when friction force evolves between the inside wall of the die and the compress powder exceeds the predetermined limit at a relief valve 137 during the hydraulic line, said oil being returnable to a tank 134.

When pressing is commenced with the cam 127 being separated from the roller 126 by setting 0=45° with the cam 127, the lower ram 117 and lower press plate 116 are not both descended, because the descending stroke of the upper ram 101 only rotates the oscillating lever 123. Namely, the die plate 107 is not descended by the action of the hydraulic cylinder 133 but supported by the cylinder 133 of the lower press plate 116. Thus, the powder 108 is only compressed downwards.

When 0=22.5, both the descent of the upper ram 101 and down-pressing of lower ram 117, i.e., the die, become as small as one half, resulting in the die descending at ½ speed, relative to that of the upper ram 101. In this case, the cylinder 133 is disposed so as to properly hold the lower ram 117.

The hydraulic circuit of the die-controlling hydraulic cylinder 118 is constructed as follows:

The air is charged from an air source 131 into the upper portion of the air/oil double layer tank 134. The oil fills the die-control cylinder 118, passing through a check valve 136, followed by being pumped by an air-driving hydraulic pump 135 up to the nominated discharge pressure. In this state, the driving air pressure balances with the discharge pressure, causing the end nut 121 of the piston rod 120 which is pushed up to the stroke end of the piston 119, to abut the rack 122 to descend the lower press ram 117.

The hydraulic cylinder 133, a piston and a piston rod 142 are installed on the lower side of the lower press plate 116 of the lower ram 117, at the position symmetrical to the die control hydraulic cylinder 118. Thus, the air source 131 applies pressure to a reducing valve 138 and an air/oil tank 139, making the oil support the weight of the lower ram 117 by lifting the rod 142 upwards from the bottom of the cylinder 133 through a check valve 140. Then, according to the descent of the upper ram 101, the die-control cylinder 118, the piston 119 and the nut 121 make the lower press plate 116 of the lower ram 117 fall down. However, since a relief valve 141 is adjusted to be lower than the hydraulic power of the upper ram 101, the movements of the die plate 107 and die 109 are controlled. Further, as described above, the lower ram 117 is pushed down through adjustment of the cam 127 wherein the lower ram 117 is withdrawn downward with the necessary supporting force being maintained.

The supporting force can be remote-controlled through adjustment of the relief valve 141 regardless of fluctuations in friction between the upper punch 105 and die 109, or between the powder 109 and the inside wall of the die 109, keeping the operation speed and stroke of the die plate 109 constant, depending only on setting of 0, resulting in optional control of the die.

Thus, in the prior art, the combination of the lever 123 with the cam 127 determines the descent timing and rate of speed of the upper punch 105 relative to the die 109 in variations of 1:1 to 1:¼. In this device, when varying the speed rate, the die control operation timing varies because of variations in abutting position of the cam roller 126 attached to the lever 123 corresponding to the variation in declining angle of the cam 127. Namely, variations in the speed rate can convert the die control timing without conversion of powder feed rate. Further, when also varying the powder feed, the operation timing varies similarly.

However, in this prior art, spaces must be prepared in the press machine proper to receive the lever 123, cam 127 or the like, which is difficult and requires exacting precision in the assembly of these parts. Furthermore, change in the die feeding will vary the operation timing of the die control, and changes in speed rate will vary the timing regardless of changes in the die feeding, except in case of 1:1, which requires readjustment due to unnecessary changes in adjustment.

The present invention provides a die control speed rate conversion device for a powder mold press by overcoming the defects as aforementioned in the prior art.

SUMMARY OF THE INVENTION

For achieving said purpose, the present invention is a mechanical withdrawal-type press, wherein the movement of an upper ram is transferred to a die through a die control hydraulic cylinder, with the end of a rod for the cylinder installed on the upper ram, pushing the die downward when an upper punch enters several mm. into the die, to compact the bottom of a product by collective descent of the upper punch and die, and in case the die is unable to fall down because of a stopper, etc., the top of the product is compacted by descending the upper punch only, with the die being stopped by releasing the hydraulic pressure at the predetermined limit, comprising the following features, structures and functions:

(1) A servomotor with a hydraulic cylinder to adjust hydraulic pressure is mounted on the hydraulic circuit for the die control hydraulic cylinder.

(2) On the major axis which operates synchronously with the upper punch, a rotary encoder is provided which locates the upper punch by sensing the angle corresponding to the stroke length of the upper punch.

(3) A linear sensor, which detects the movement of the upper punch, is provided on a subactuator of the upper punch.

(4) Based on the signals detected from the rotary encoder and linear sensor, a servomotor control device is provided.

When the upper punch falls down together with the die, the descending speed of the die is reduced corresponding to a reduction of oil pressure due to hydraulic release from the die control hydraulic cylinder. Since the servomotor with a hydraulic cylinder to adjust the hydraulic pressure is provided on the oil circuit for the die control hydraulic cylinder, the oil releasing rate from the cylinder can be freely controlled. Thus, the rate of descent can also be freely controlled.

Further, owing to the rotary encoder which locates the upper punch, the servomotor can be controlled by the signal from the encoder, resulting in timely location of the upper punch for appropriate oil release from the die control hydraulic cylinder.

Moreover, the movement of the die can be adjusted at any rate by controlling the servomotor owing to the signal from a linear sensor, mounted on a subactuator, such as the lower press plate, so as to detect the movement of the upper punch.

Thus, the timing of the die control action will not fluctuate regardless of variations in other adjustments when the angle has once been determined according to the signal from the rotary encoder mounted to the major axis so as to actuate synchronously with the upper punch.

BRIEF DESCRIPTION OF THE DRAWINGS

The object and features of the present invention will become more readily apparent from the following detailed description taken in conjunction with the accompanying drawings in which.

DETAILED DESCRIPTION OF THE INVENTION

Figure 1:
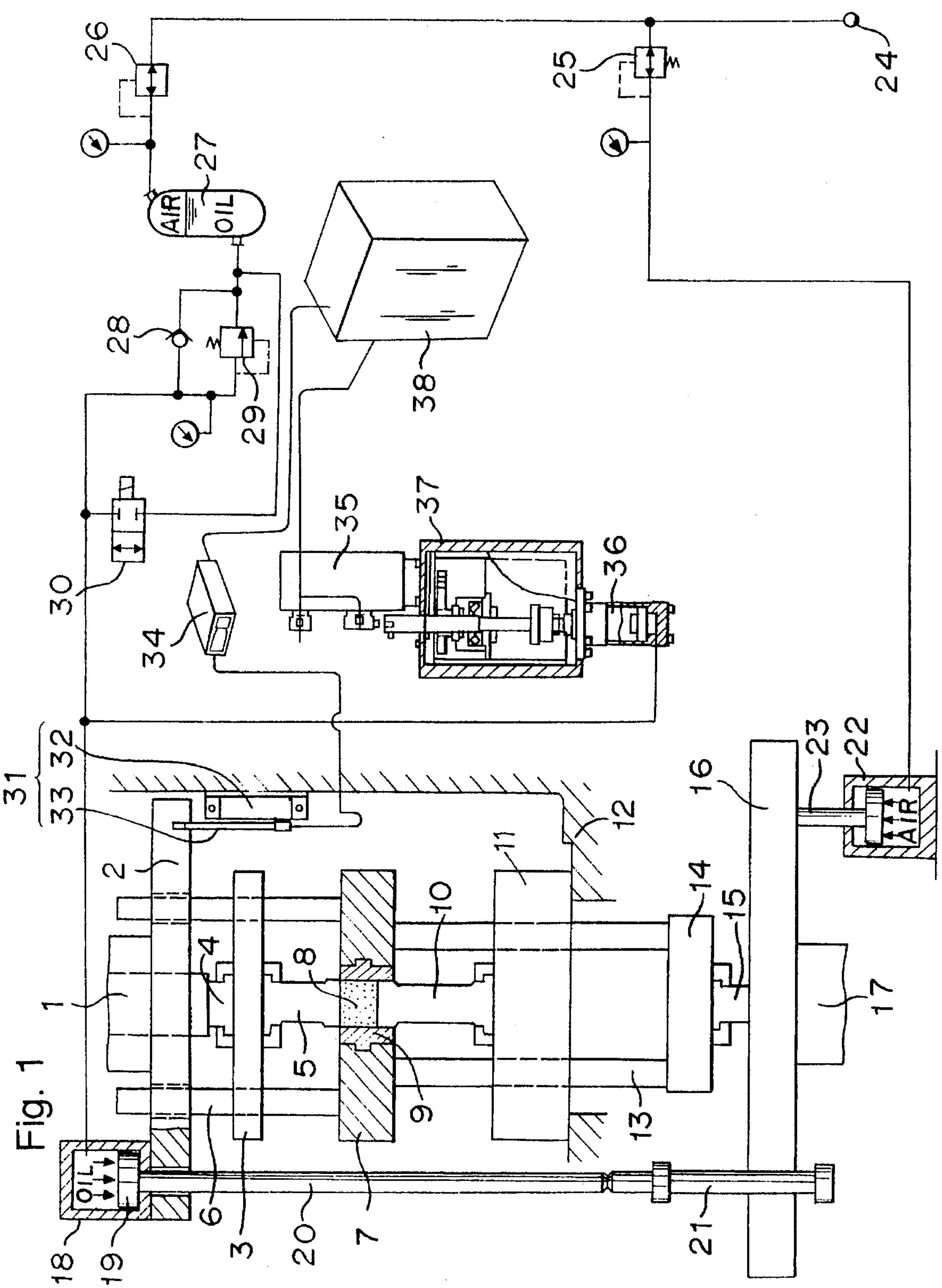
FIG. 1 shows the comprehensive structure of the embodiment of the present invention.
Figure 2:
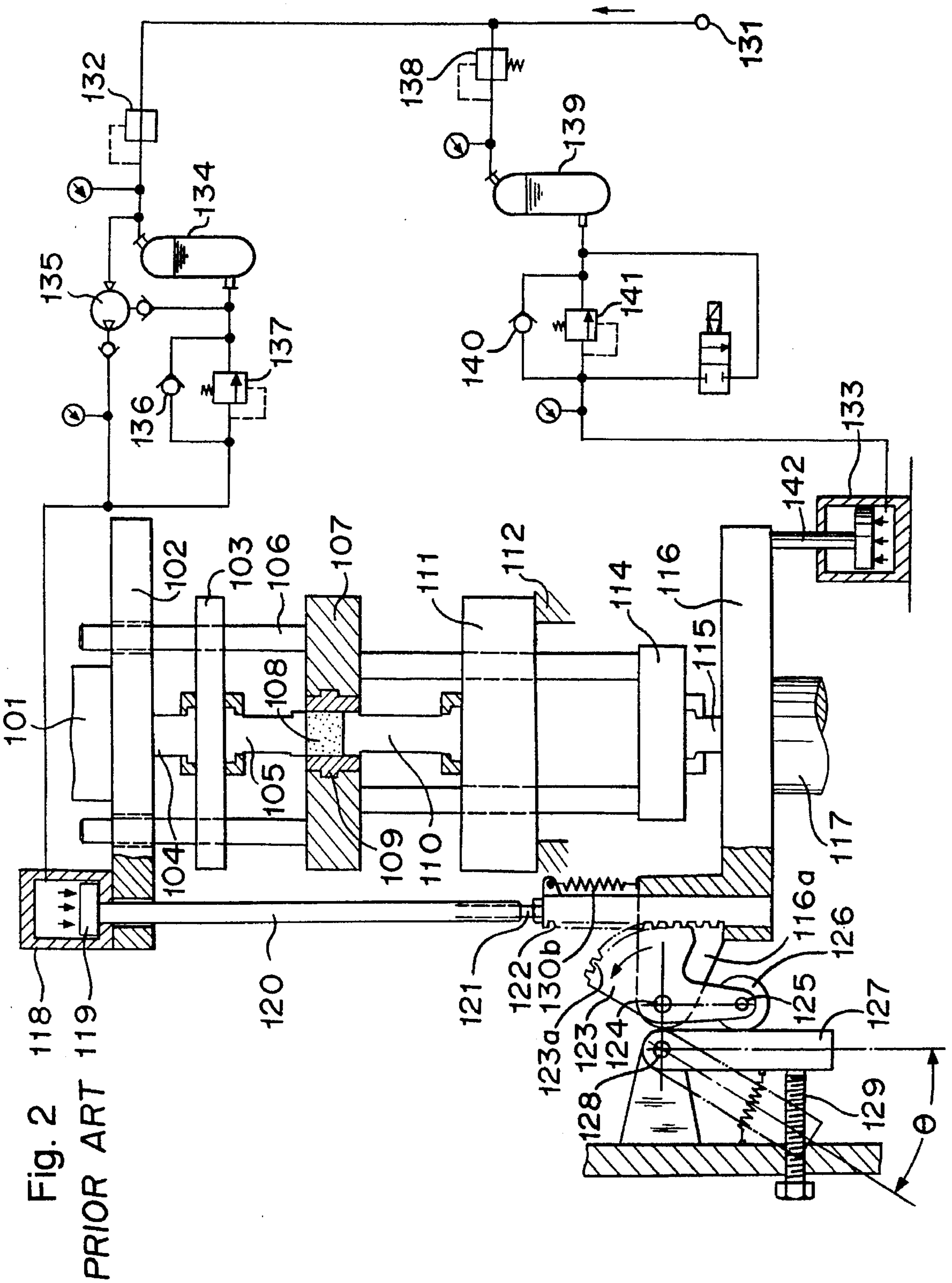
Fig. 2 PRIOR ART
FIG. 2 shows the comprehensive structure of the prior art.

The present invention is described in accordance with the depicted embodiment, as follows:

In FIG. 1, a lower descending press plate 2 is suitably attached integrally to the lower portion of an upper ram 1 of the press, said lower descending press plate 2 being connected with an upper punch plate 3 of the die set through a joint 4. The lower portion of a lower press plate 16 is attached to the upper portion of a lower ram 17, said lower press plate 16 being connected with an injection plate 14 through a joint 15.

A plurality connecting pads 13 are installed vertically on the injection plate 14 through a die set fixing plate 11 secured to a bolster 12 comprising a plurality of presses, said rod 13 being connected with a die plate 7.

A plurality of guide rods 6 are embedded in the die plate 7, said rods 6 being engaged slidably and vertically with an upper punch plate 3, and thus, an upper punch 5 is disposed so as to enter into, and leave from, a die 9.

A lower punch 10, mounted on a die set fixing plate 11 secured to the bolster 12 of the press is engaged with the die 9 through the vertical movement of the die plate 7.

On the descent press plate 2 of the upper ram 1, the die control hydraulic cylinder 18 is provided with a piston 19 having a rod 20, extended downward, making the lower end thereof abut to the top of an adjusting nut 21 for die control timing which is threaded with the lower descent press plate 16. The clearance between the rod 20 and the nut 21 decreases, along with the descent of the upper punch 5 from the upper surface of the die 9, resulting in such abutment.

In the hydraulic circuit of the die control hydraulic cylinder 18, the oil is fed to the cylinder 18 through a check valve 28 by charging air into the upper portion of an air/oil double layer tank 27, and then, when the friction force, produced within the powder inside the die wall by the compressing stroke of the lower punch 10, exceeds the predetermined value at a relief valve 29, the hydraulic oil is discharged, and then returned to the tank.

The weight of the lower ram 17 is supported by air provided from an air source 24 through the structure wherein a piston rod 23 of an air cylinder 22 is connected with the back side of the lower descent press plate 16 of the lower ram 17.

A servomotor 35 with a hydraulic cylinder 36 is mounted on the hydraulic circuit so as to release the hydraulic pressure of the hydraulic cylinder 18. The servomotor 35 is connected with a control device 38 to control the driving of the motor 35.

Further, a linear sensor 31, to detect the movement of the upper punch 5, is connected with the control device 38 through a pulse unit 34, and the rotary encoder (not illustrated), to indicate the position of the upper punch 5 by means of the detected angle corresponding to the stroke length of the punch 5, is connected with the main axis of the press (not illustrated) which actuates synchronous to the upper punch 5, thus controlling the servomotor 35 through the signals detected from the linear sensor 31 and the rotary encoder.

The linear sensor 31 comprises a movable portion 33 installed on the lower descent plate 2 and a stationary portion 32 fixed to the bolster of the press.

Further, in FIG. 1, numerals 8, 25, 26, 30, 37 denote the powder, a regulator, a regulator, an electromagnetic valve and a speed rate converter of the servomotor 35, respectively, said speed rate converter 37 being connected with the hydraulic cylinder 36.

During press compression, when the upper punch 5 enters several mm. into the die, the lower end of the rod 20 of the hydraulic cylinder 18 moving together with the upper ram 1 descends the adjusting nut 21 for die control timing, which moves integrally with the die 9, causing the upper punch 5 together with the die 9 to descend, thus compacting the bottom side of the powder. If the upper punch 5 continues to descend even when the die 9 is unable to descend due to a die stopper, etc., (not illustrated) the oil pressure of the hydraulic cylinder 18 rises. In case such oil pressure exceeds the limit at the relief valve 29, the oil is released from the valve 29 into the air/oil double layer tank 27, followed by stopping the die 9 and descending of the upper punch only, resulting in compacting the upper side of the powder 8.

In this case, the descent of the upper punch 5 together with the die will cause the oil of the hydraulic cylinder 18 to move. However, when releasing the oil pressure, the speed of descent of the piston 19 is reduced, also causing a reduction in the descent speed of the die 9. On the hydraulic circuit for the hydraulic cylinder 18, the servomotor 35 with the hydraulic cylinder 36 is provided which can control the rate of oil release, leading to free control of the descent speed of the die 9.

Since the rotary encoder, functioning as aforementioned, is provided on the main axis of the press actuating synchronously with the upper punch 5, the correct timing for releasing the oil from the hydraulic cylinder 18 corresponding to the appropriate position of the upper punch 5 can be achieved by means of controlling the servomotor 35, subject to the control device 38 based on the signals from the encoder.

Moreover, the movement of the die 9 can be controlled at any rate because a linear sensor 31, provided on the lower press plate 2 of the upper punch 5, sends signals to the control device 38 so as to control the die 9 through the servomotor 35.

In summary, the timing for oil release from the hydraulic cylinder 18 can be obtained through the angle signal (position signal) from the rotary encoder installed on the main axis of the press actuating synchronously with the upper punch 5, and the speed of descent of the die 9 relative to that of the upper ram 1 can be controlled at any rate ranging from 1:1 to 1:¼ by the servomotor 35, controlled by the signal from the linear sensor detecting the movement of the upper ram 1. (For reference, although FIG. 1 shows only one hydraulic cylinder 18 and the air cylinder 22, respectively, another one of each are usually provided at the opposite sides of the upper descending press plate 2 and the lower descending press plate 16, respectively.)

Moreover, since the operation timing for the die control is determined by the angle signal from the rotary encoder mounted on the main axis actuating synchronously with the upper punch, after said angle is determined, problematic readjustment is no longer necessary, regardless of variations in any other adjustments.

Furthermore, assembly using a number of complicated and fluctuating element parts has, heretofore, become greatly time-consuming and expensive. In the present invention, however, only the control system on the hydraulic circuit for the die controlling hydraulic cylinder is required, resulting in simple assembly work comprising only the attachment of the control unit with a servomotor to the suitable position of the press machine proper through a simple piping work.

I claim:

1. A powder molding press having a die, upper and lower rams, and upper and lower punches, comprising:

a die-control hydraulic cylinder movable together with said upper ram, said lower ram connected to a piston rod of said die-control hydraulic cylinder, and said lower ram moving said die;

a hydraulic oil circuit connected to said die-control hydraulic cylinder;

a relief valve provided in said hydraulic oil circuit, said relief valve relieving hydraulic oil pressure when said hydraulic oil pressure in said die-control hydraulic cylinder reaches a predetermined pressure after said die is urged to a die stopper, and is not moveable together with said upper ram, a hydraulic pressure regulating cylinder, having a piston, and being connected to said die-control hydraulic cylinder by said hydraulic oil circuit, said hydraulic pressure regulating cylinder regulating hydraulic oil quantity for reducing the hydraulic oil pressure in said die-control hydraulic cylinder by the movement of said piston;

and a servo motor moving said piston of said hydraulic pressure regulating cylinder.

2. The powder molding press as claimed in claim 1, further including a rotary encoder capable of detecting a position of said upper punch through the detection of an angle corresponding to a stroke distance of said upper punch, said rotary encoder being provided on said press and moving synchronously with said upper punch; a linear sensor, mounted on a follow member of said upper punch for detecting the movement thereof, and a servo rotor controlling device operating in accordance with signals received from both said rotary encoder and said linear sensor.

* * * * *